United States Patent [19]

Wohlford et al.

[11] Patent Number: 4,645,274
[45] Date of Patent: Feb. 24, 1987

[54] RESTRAINTS FOR CONTROLLING UNDESIRED DEFLECTION OF TRACK LINK SECTIONS EMBODYING A FLEXOR

[75] Inventors: William P. Wohlford, Bettendorf, Iowa; Bernard B. Poore, East Moline, Ill.

[73] Assignee: Deere & Company, Moline, Ill.

[21] Appl. No.: 770,468

[22] Filed: Aug. 29, 1985

[51] Int. Cl.⁴ .................... B62D 55/24; B62D 55/28
[52] U.S. Cl. .................... 305/47; 305/35 R; 305/43
[58] Field of Search ............ 305/35 R, 35 EB, 40–43, 305/47–49; 474/202, 206, 207, 232, 233; 198/847, 850; 16/225, DIG. 13

[56] References Cited

U.S. PATENT DOCUMENTS

| | | | |
|---|---|---|---|
| 1,808,445 | 6/1931 | Armington | 305/48 |
| 4,036,538 | 7/1977 | Haslett et al. | 305/47 |
| 4,116,497 | 9/1978 | Schimpf et al. | 305/47 X |
| 4,428,625 | 1/1984 | Wohlford | 305/35 R X |

FOREIGN PATENT DOCUMENTS

| | | | |
|---|---|---|---|
| 211964 | 4/1967 | Sweden | 305/40 |
| 248839 | of 0000 | United Kingdom | 305/48 |

*Primary Examiner*—David A. Scherbel

[57] ABSTRACT

An endless track is composed of a plurality of link sections embodying flexors which interconnect and permit flexure between adjacent links. Connected between confronting ends of the link sections outboard of the flexors are torsional restraint assemblies which include a combination of rigid and elastomeric members which resist forces tending to twist the flexors or tending to bend the flexors into an S-shape while permitting flexure between adjacent links about a normal center of articulation, as when the track passes around a drive sprocket, for example.

5 Claims, 4 Drawing Figures

RESTRAINTS FOR CONTROLLING UNDESIRED DEFLECTION OF TRACK LINK SECTIONS EMBODYING A FLEXOR

BACKGROUND OF THE INVENTION

The present invention relates to track link sections embodying flexors for interconnecting and establishing flexible joints between track link sections of an endless track.

Known endless tracks composed of rigid link section components interconnected by flexible components called flexors have the capability of operating such that the flexible joints could deflect in a manner that is detrimental. For example, loads in the upward and downward directions respectively applied to the rigid link components of adjacent link sections may cause the interconnecting flexor to be deformed in the shape of an "S". This may occur with loads applied evenly across the link section components or with loads occurring at one extremity of the link section in the width direction, the latter loading twisting the flexors.

SUMMARY OF THE INVENTION

According to the present invention there is provided an improved link section structure of the type embodying a flexor and more specifically there is provided an improved link structure for preventing detrimental flexor deformation.

A broad object of the invention is to provide a link section structure constructed such that rigid components of adjacent link sections cooperate to control detrimental deformation of a flexor interconnecting the adjacent link sections while permitting desired flexure between the link sections.

More specifically, with respect to one embodiment, it is an object of the invention to provide a link section comprising rigid components having trailing and leading ends each formed in part by a pair of outboard projections, with the projections at the leading end of one link section being adapted for resilient interconnection with the projections at the trailing end of an adjacent link section.

With respect to another embodiment, it is an object of the invention to provide a link section comprising rigid components each having outboard portions adapted for clamping engagement with one end of a restraint assembly adapted for having its opposite end clamped between outboard portions of an adjacent link section, the restraint assembly including a torsionally deflectable portion.

These and other objects, features and advantages of the present invention will become apparent to those skilled in the art from the description which follows and from the drawings.

DESCRIPTION OF THE PREFERRED EMBODIMENT

Figure 1:
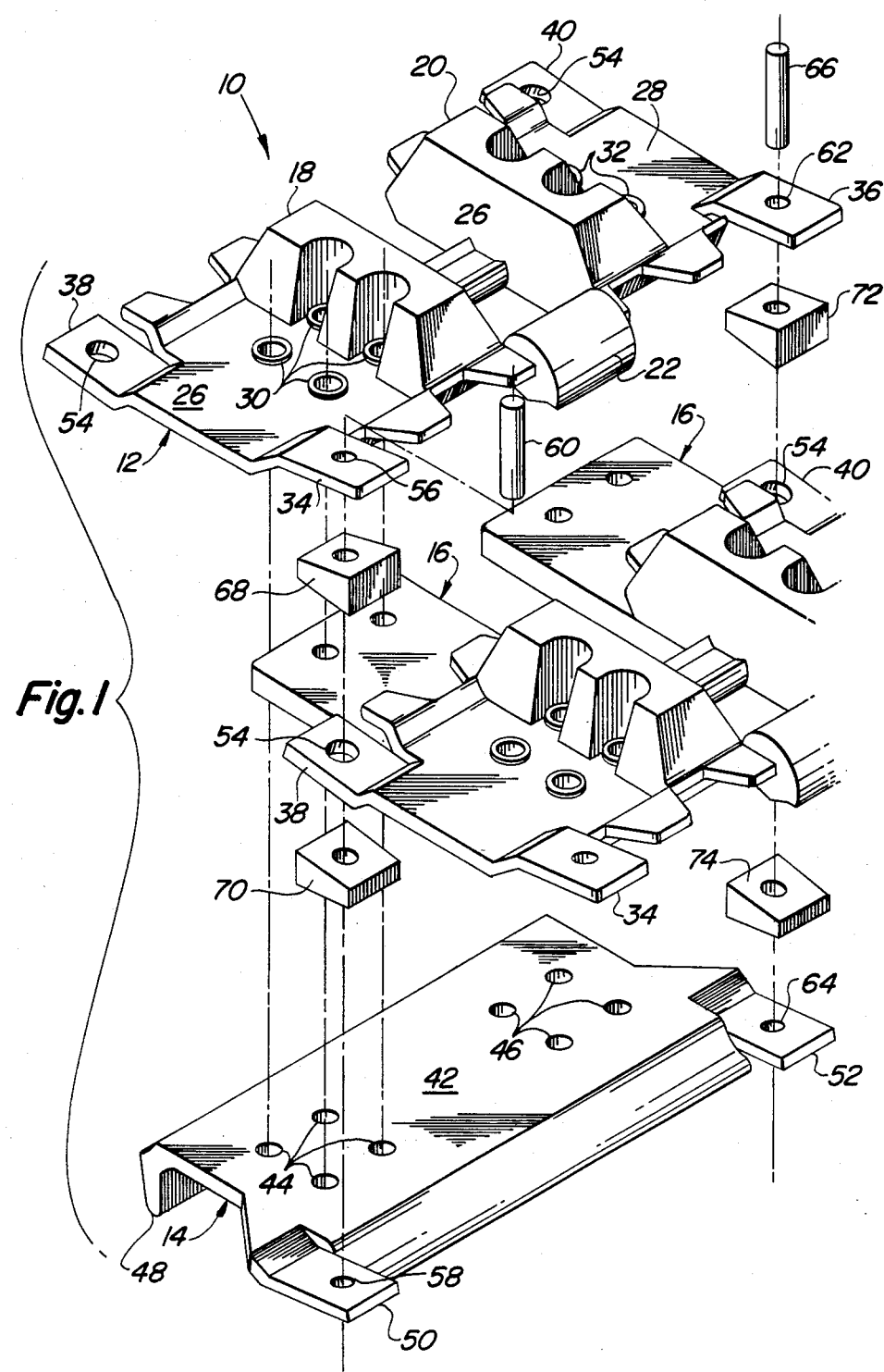
FIG. 1 is a perspective exploded view of a link section constructed in accordance with the present invention.
Figure 2:
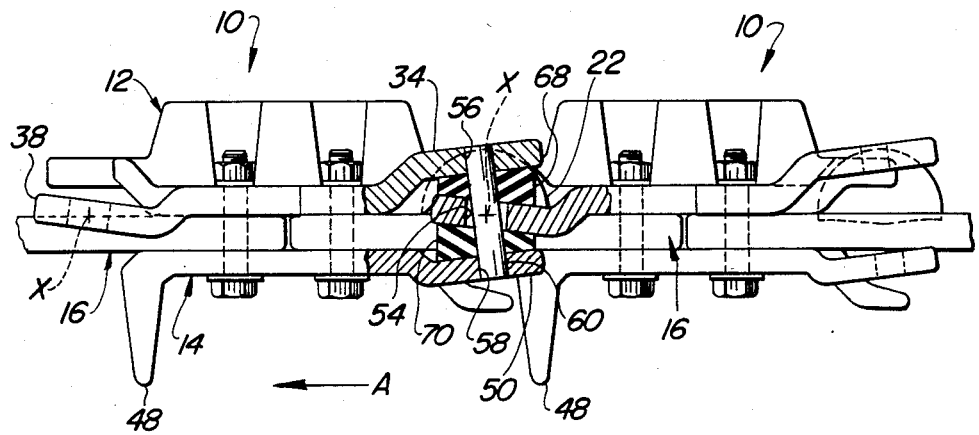
FIG. 2 is a vertical sectional view taken through one outboard connection between adjacent link sections of the construction shown in FIG. 1.

Referring now to FIG. 1, there is shown a track link section 10 adapted for interconnection with like sections, as shown in FIG. 2, for forming an endless track for a track laying vehicle, such as a crawler tractor, for example. When embodied in a track, the link section 10 would be driven in the direction A so as to effect forward motion of the vehicle. Certain terms used herein, such as leading, trailing, right and left are made with reference to this direction.

The link section 10 includes a link 12 and a grouser 14 secured together in clamping relationship to first ends of a pair of transversely spaced flexors 16. The links 12 include transversely spaced upright rail portions 18 and 20 joined at their rightward or trailing ends by a transverse sprocket-engaging portion 22 defined by a transverse, generally semi-cylindrical bar. The rail portions 18 and 20 are also joined at respective locations intermediate of their ends by a transverse bar 24. The upright rail portions 18 and 20 are respectively joined to horizontal plate portions 26 and 28 in which are respectively located two sets of four vertical mounting holes 30 and 32. Respectively located at trailing outboard locations of the plate portions 26 and 28 are rearwardly extending mounting ears 34 and 36 which are angled upwardly from the plate portions and extend above a center or axis of articulation X of the link section, this center being coincident with the axis of the semi-cylindrical sprocket-engaging portion 22. Joined to leading outboard locations of the plate portions 26 and 28 are forwardly extending mounting ears 38 and 40, respectively, which are angled upwardly and forwardly along a plane which intersects the articulation center X of an adjacent link section, as appears in FIG. 2.

The grouser 14 includes a central horizontal plate portion 42 disposed vertically below the link plate portions 26 and 28 and containing two sets of four mounting holes 44 and 46 respectively aligned with the sets of holes 30 and 32. Depending from the leading end of the plate portion 42 is a transverse cleat 48. Respectively located at opposite trailing outboard locations of the plate portion 42 are mounting ears 50 and 52 which extend rearwardly below the center of articulation in parallel relationship to the link mounting ears 34 and 36 so as to cooperate therewith to form first and second clevises.

When adjacent link sections 10 are interconnected, as shown in FIG. 2, the leading ears 38 and 40 of a trailing one of the link sections are respectively disposed between the trailing ears 34 and 50, and between the trailing ears 36 and 52 of a leading one of the link sections. Extending perpendicular relative to and through each of the leading ears 38 and 40 is a hole 54 (only one shown) having an axis which intersects the axis of articulation X of the leading link section. The trailing ears 34 and 50 are respectively provided with holes 56 and 58 which are aligned with each other along an axis which also intersects the center of articulation X. The holes 56 and 58 are of the same size and are smaller than the hole 54. A pin 60 is press fit into the holes 56 and 58 and passes freely through the hole 54. The trailing ears 36 and 52 are similarly provided with holes 62 and 64 which are aligned along an axis which intersects with the center of articulation X. Press fit into the holes 62 and 64 is a pin 66 which passes freely through the hole 54 of the ear 40. Located on the pin 60 respectively above and below the ear 38 are wedge shaped elastomeric pads 68 and 70 which together with the pin establish a tight, resilient joint between the ears 34 and 50 and the ear 38. Similarly, located on the pin 66 respectively above and below the ear 40 are wedge shaped elastomeric pads 72 and 74 which together with the pin establish a tight, resilient joint between the ears 36 and 52 and the ear 40.

During operation of a track embodying a series of interconnected track link sections 10, the joint between an adjacent pair of the link sections will become articulated, as when engaging a drive sprocket, the elastomeric pads 68-74 will compress and extend at their fore-and-aft edges. And, the retaining pins 60 and 66 will rock freely in the holes 54. Thus, there is little resistance to normal, desired articulation. As the track engages the terrain at a work site, vertical loads will be exerted on the link sections 10. It will be appreciated that before the flexors can be deformed into an "S" shape, it is first necessary for the rubber pads 68-74 to be compressed. Because these pads resist compressive deflection, the vertical loads imposed on one of the link sections are transferred to the other link section across the resilient joint established between the overlapping sets of ears.

Figure 4:
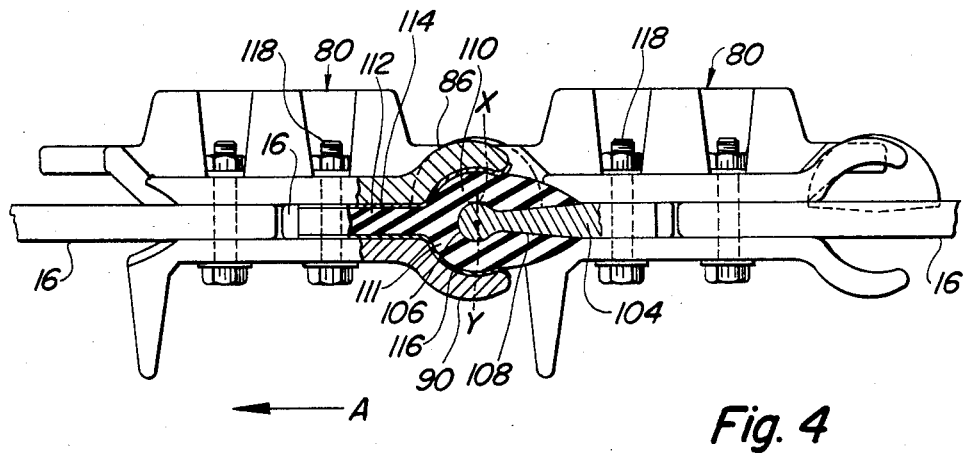
FIG. 4 is a vertical sectional view taken through one outboard connection between adjacent link sections of the construction shown in FIG. 3.
Figure 3:
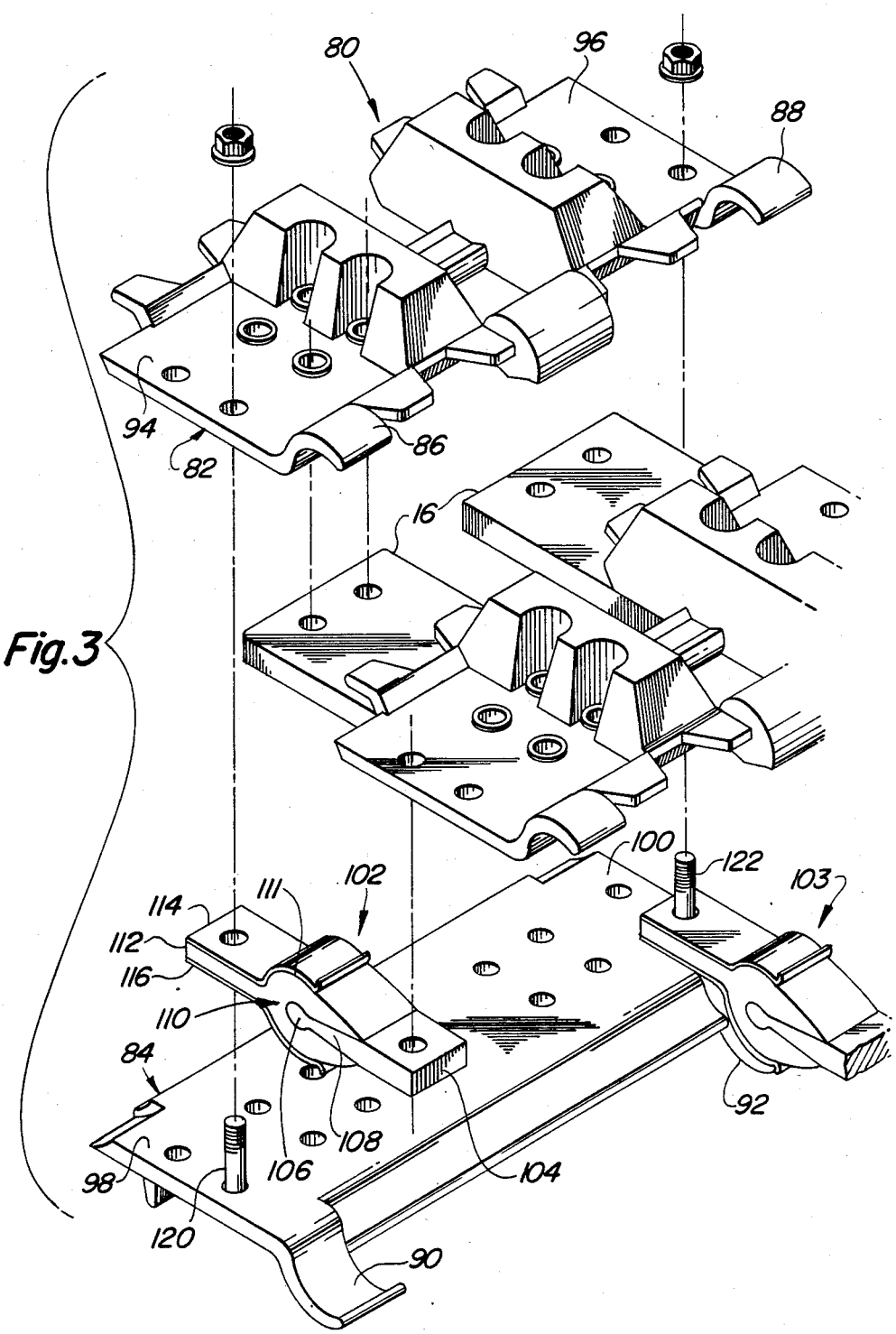
FIG. 3 is a perspective exploded view of another embodiment of a link section constructed in accordance with the present invention.

Referring now to FIGS. 3 and 4, there is shown a link section 80 which is an alternate to the embodiment of FIGS. 1 and 2 described above. The link section 80 is quite similar to the link section 10 except that the outboard projections thereof are somewhat different and only these projections are described in detail.

Specifically, the link section 80 includes a link 82 and a grouser 84 secured together in clamping relationship to first ends of a pair of the flexors 16.

Respectively forming part of and located at trailing outboard locations of the link 82 are rearward projections 86 and 88 which include trailing portions curved arcuately about a horizontal transverse axis or center of torsion Y which is located midway between the ends of and in a central horizontal plane passing through the flexors 16 when the latter are horizontally disposed. Respectively located beneath the projections 86 and 88 are projections 90 and 92 which form part of and are located at trailing outboard locations of the grouser 84. The projections 90 and 92 also include portions curved arcuately about the axis Y and thus cooperate with the projections 86 and 88 to define a semi-cylindrical socket having a purpose set forth herein below. The link 82 includes flat portions 94 and 96 respectively located at outboard locations thereof. Similar flat portions 98 and 100 are at outboard locations of the grouser 84 respectively vertically beneath the flat portions 94 and 96.

First and second identical restraint assemblies 102 and 103 extend between and are connected to opposite outboard portions of adjacent link sections. Specifically, the assemblies 102 and 103 each include a rigid plate 104 having a leading end 106 which is cylindrical in side view and located on the axis Y. The trailing end portion of the plate is flat and is joined to the end 106 by an intermediate section 108 having upper and lower surfaces converging toward the end 106. The intermediate section 108 and cylindrical end 106 are molded into a trailing end portion of an elastomeric section 110 including a part 111 formed cylindrically about the axis Y and having a flat forward end portion 112. Bonded to upper and lower surfaces of the flat and cylindrical parts of the elastomeric section 110 are sheet metal retainers 114 and 116, respectively.

The restraint assembly 102 is mounted with its flat trailing portion being held sandwiched between the leading end of flat outboard portions 94 and 98 of one link 82 and grouser 84 by a bolt 118, with its flat leading end portion being held sandwiched between the trailing end of flat outboard portions 94 and 98 of and adjacent link and grouser by a bolt 120, and with its central cylindrical portion being tightly received in the receptacle defined by the projections 86 and 90 of the adjacent link and grouser.

The restraint assembly 103 is similarly mounted to the opposite outboard portion of adjacent link sections 80 wherein its trailing and leading ends are held in place by an unshown bolt and a bolt 122, respectively.

During operation, the restraint assemblies 102 and 103 act to carry vertical forces, applied on an adjacent pair of link sections on opposite sides of the axis of articulation, across the axis through compression of the elastomeric section 110. When the flexor bends about the axis of articulation, the elastomer deflects in torsion. The center of torsional deflection is located at a point where minimal deflection takes place.

We claim:

1. In an endless track including a plurality of identical link sections, each including a link member, a grouser member and at least one flexor having a first end sandwiched between the link and grouser members with the opposite end of the flexor being sandwiched between the link and grouser members of an adjacent link section, said flexor thereby establishing a flexible interconnection between adjacent link sections, the improvement comprising: flexure control means acting between adjacent link sections for substantially constraining the flexor interconnecting adjacent link sections for flexing only about a desired horizontal transverse axis of articulation located midway between the first and opposite ends of the flexor.

2. The endless track of claim 1 wherein said flexure control means includes a plurality of projections formed integrally with one end of one of the adjacent track link sections and forming first and second clevises located at opposite sides of the flexor and, first and second projections formed integrally with one end of the other of the adjacent track link sections and respectively disposed in the first and second clevises and passing through said desired axis of articulation; each of said first and second projections being spaced from respective projections forming the clevises and containing a hole centered about said axis; a pair of pins respectively loosely received in the holes provided in the first and second projections and being respectively rigidly fixed to the first and second clevises; and elastomeric pad means being received on each pin and sandwiched between the respective projections making up the first and second clevises and the first and second projections.

3. The endless track defined in claim 1 wherein said flexure control means includes first and second torsional restraint assemblies located at opposite sides of the flexor interconnecting adjacent link sections; one end of one of the adjacent link sections being provided with a first set of upper and lower portions respectively forming parts of the link and grouser at one side of the flexor, and with a second set of upper and lower portions respectively forming parts of the link and grouser at another side of the flexor; one end of another of the adjacent link sections being provided with a third set of upper and lower portions respectively forming parts of the link and grouser in fore-and-aft alignment with the first set of portions, and with a fourth set of upper and lower portions respectively forming parts of the link and grouser in fore-and-aft alignment with the second set of portions; first and second torsional restraint assemblies each including a rigid plate section with the plate sections of the first and second assemblies being respectively clamped between the first set and between the second set of upper and lower portions; said torsional restraint assemblies each further including an elastomeric section with the elastomeric sections of the first and second assemblies being respectively clamped between the third set and between the second set of upper and lower portions; each rigid plate section including an end terminating in the vicinity of said axis of articulation and being formed cylindrically about an axis of torsion paralleling said axis of articulation; and each elastomeric section including a portion surrounding and bonded to the cylindrical end of the rigid plate.

4. The endless track defined in claim 3 wherein each elastomeric section includes a portion shaped cylindrically about the axis of torsion; and first and second sets of projections being provided on said another of the adjacent link sections and shaped to tightly receive a respective cylindrically shaped portion of one of the elastomeric sections.

5. The endless track defined in claim 4 wherein those portions of each elastomeric section which is clamped between the upper and lower portions of the third and fourth sets of portions and between the first and second sets of projection has upper and lower sheet metal retainers respectively bonded to upper and lower surfaces thereof.

* * * * *